US008132067B2

(12) United States Patent
Tokoro et al.

(10) Patent No.: US 8,132,067 B2
(45) Date of Patent: Mar. 6, 2012

(54) OFDM RECEIVING APPARATUS AND OFDM RECEIVING METHOD

(75) Inventors: Kenichi Tokoro, Kanagawa (JP); Takashi Seki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 871 days.

(21) Appl. No.: 12/185,470

(22) Filed: Aug. 4, 2008

(65) Prior Publication Data

US 2009/0044074 A1    Feb. 12, 2009

(30) Foreign Application Priority Data

Aug. 7, 2007    (JP) .................................. 2007-205816

(51) Int. Cl.
G06F 11/00    (2006.01)
(52) U.S. Cl. ........................................ 714/746; 375/347
(58) Field of Classification Search .................. 714/746, 714/751; 375/347
See application file for complete search history.

(56) References Cited

U.S. PATENT DOCUMENTS

| 6,542,203 | B1 | 4/2003 | Shadwell et al. | |
|---|---|---|---|---|
| 7,165,193 | B2 * | 1/2007 | Chen et al. | 714/45 |
| 7,424,073 | B2 * | 9/2008 | Okada | 375/347 |
| 7,587,006 | B2 * | 9/2009 | Taniguchi et al. | 375/347 |
| 7,787,828 | B2 * | 8/2010 | Horiguchi et al. | 455/73 |
| 7,961,825 | B2 * | 6/2011 | Tokoro et al. | 375/347 |
| 2004/0216022 | A1 * | 10/2004 | Ghazi-Moghadam et al. | 714/742 |
| 2005/0180332 | A1 * | 8/2005 | Kim et al. | 370/244 |
| 2007/0025473 | A1 | 2/2007 | Aizawa et al. | |
| 2007/0126936 | A1 * | 6/2007 | Fujihira et al. | 348/729 |
| 2007/0201589 | A1 * | 8/2007 | Tokoro et al. | 375/347 |
| 2010/0023836 | A1 * | 1/2010 | Miyoshi et al. | 714/751 |

FOREIGN PATENT DOCUMENTS

| JP | 2000-152106 A | 5/2000 |
|---|---|---|
| JP | 2002-344965 A | 11/2002 |
| JP | 2002344965 A * | 11/2002 |
| JP | 2003-152579 A | 5/2003 |

* cited by examiner

Primary Examiner — Yolanda L Wilson
(74) Attorney, Agent, or Firm — Foley & Lardner LLP

(57) ABSTRACT

An OFDM receiving apparatus has N sets of reception and demodulation units which input one segment broadcasting signals of ground digital broadcasting received with N sets of antennas and demodulate the signals; a buffer unit which includes N sets of buffers which hold temporarily N sets of demodulated data, which are demodulated in the N sets of reception and demodulation units, respectively, and reads the N sets of demodulated data, which are written in the N sets of buffers, in time division; and an error correction unit which inputs N sets of demodulated data read from the buffer unit in time division, performs error correction one by one, and in the process of the error correction, multiplexes the N sets of demodulated data, which have been error-corrected, in a period not used by one segment reception to output the data as one TS multiplex data.

18 Claims, 12 Drawing Sheets

| MODE | EFFECTIVE SYMBOL LENGTH | GUARD INTERVAL LENGTH | | | EFFECTIVE DATA |
|---|---|---|---|---|---|
| | | (1/4) | (1/8) | (1/16) | |
| MODE 1 | 256 | 64 | 32 | 16 | 96 |
| MODE 2 | 512 | 128 | 64 | 32 | 192 |
| MODE 3 | 1024 | 256 | 128 | 64 | 384 |

NUMERICAL VALUE IS NUMBER OF SAMPLES.

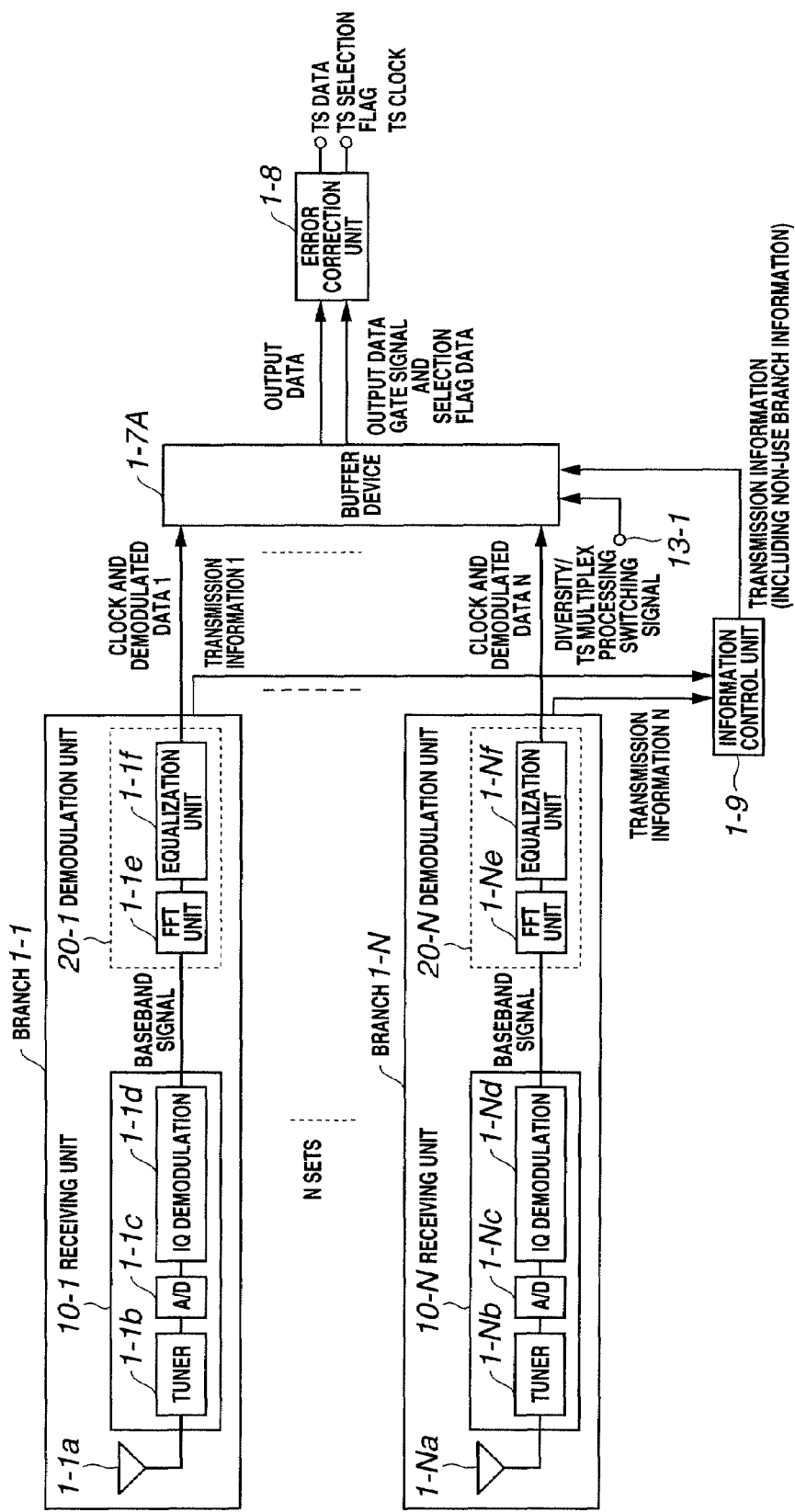

FIG.12

| MODE | | NUMBER OF TSP INCLUDED IN 1 MULTIPLEX FRAME | | |
|---|---|---|---|---|
| | | GUARD INTERVAL RATIO 1/4 | GUARD INTERVAL RATIO 1/8 | GUARD INTERVAL RATIO 1/16 |
| ONE SEGMENT FORMAT | MODE 1 | 80 | 72 | 68 |
| | MODE 2 | 160 | 144 | 136 |
| | MODE 3 | 320 | 288 | 272 |

FIG.13

| CARRIER MODULATION | CONVOLUTION CODE | NUMBER OF TRANSMITTED TSP (MODE 1/2/3) |
|---|---|---|
| DQPSK/QPSK | 1/2 | 12/24/48 |
| | 2/3 | 16/32/64 |
| 16QAM | 1/2 | 24/48/96 |

NUMBER OF TRANSMITTED TSP IS PER FRAME

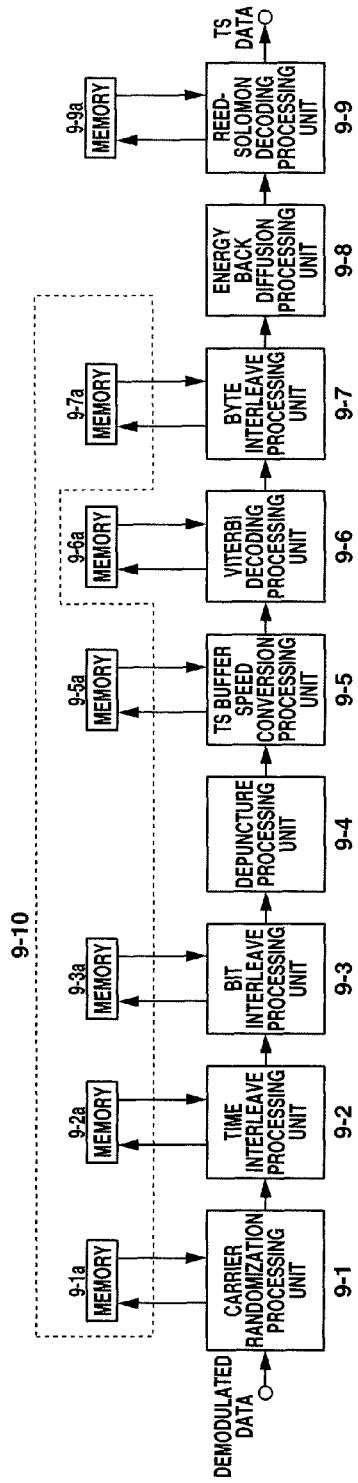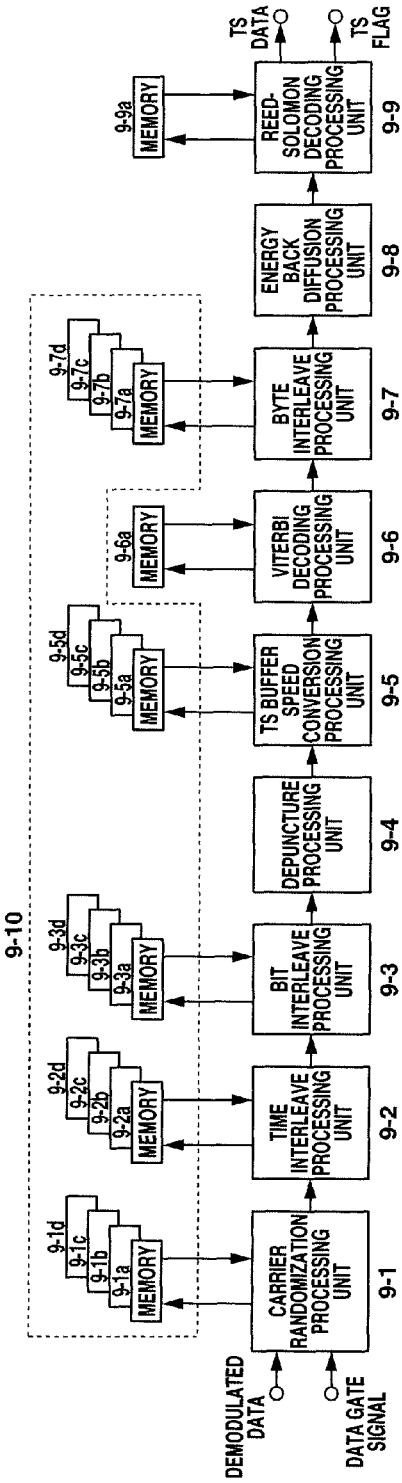

US 8,132,067 B2

OFDM RECEIVING APPARATUS AND OFDM RECEIVING METHOD

CROSS REFERENCE TO RELATED APPLICATION

This application is based upon and claims the benefit of priority from the prior Japanese Patent Application No. 2007-205816 filed on Aug. 7, 2007; the entire contents of which are incorporated herein by reference.

BACKGROUND OF THE INVENTION

1. Field of the Invention

The present invention relates to an OFDM receiving apparatus and an OFDM receiving method using one segment reception of terrestrial digital broadcasting.

2. Description of the Related Art

In terrestrial digital broadcasting, one segment reception towards cellular phones and personal digital assistants was started. With showing a parameter example of one segment reception in an actual condition, a modulation system is a QPSK, a guard interval ratio is 1/8, a convolution code is 2/3, and a bit rate is broadcast at 416 kbps.

Since one segment reception is broadcast using one central segment among 13 segments in a frequency band which the present television broadcasting stations have been already assigned, only one segment reception is performed to one station among the terrestrial digital television broadcasting stations.

A receiver dedicated for one segment reception has a characteristic that circuit scale is smaller than that of a 13 segment receiver by performing reception using only a part of a synchronized signal in the whole 13 segments so as to make receiving processing into the minimum, and consumed power can be also suppressed.

In the meantime, demands for two or more channels of simultaneous reception (e.g., requests of recording of a program on a different channel and diversity reception) have increased also in in-vehicle TVs and portable mobile receivers these days, and use of configuration of using a plurality of receivers so as to satisfy such demands ends up losing a valuable feature that circuit scale is small. In particular, in configuration of arranging a plurality of receivers, unless circuitry and circuit scale of a receiver change, whether in one segment or in 13 segments, a circuit increment of an error correction unit becomes conspicuous as the number of channels increases.

As a conventional data transmission system using a plurality of channels, there are some which transmit and receive a transport stream at a high bit rate requiring a wide band, even if it is a transmission line of a narrow band per channel, by performing transmission after dividing a high bit rate transport stream (TS) into a plurality of channels by a transport stream packet (TSP) (e.g., refer to Japanese Application Patent Laid-Open Publication No. 2002-344965).

There are some others which achieve an inexpensive receiver or TV set by receiving digital signals of carrier waves at several different frequencies with a plurality of tuners respectively, and demodulating a digital base band signal from the plurality of tuners in time division with one demodulator (e.g., refer to Japanese Patent Application Laid-Open Publication No. 2000-152106).

However, the ones described in Japanese Patent Application Laid-Open Publication Nos. 2002-344965 and 2000-152106 cannot receive two or more channels of one segment broadcasting signals in ground digital broadcasting simultaneously.

Furthermore, a conventional digital receiver including a one segment receiver has an issue that a channel change is not necessarily performed in an instant, but switching time (time from a tuner receiving a carrier wave to outputting it as TS data) is necessary, namely time for 2 to 4 seconds is required from a change performing operation to a next channel being outputted on a screen.

SUMMARY OF THE INVENTION

According to an aspect of the present invention, an OFDM receiving apparatus is provided, which includes N (N is an integer of two or more) sets of reception and demodulation units which input one segment broadcasting signals of terrestrial digital broadcasting received with N sets of antennas and demodulate the signals, a buffer unit which includes N sets of buffers which hold temporarily N sets of demodulated data, which are demodulated in the N sets of above-mentioned reception and demodulation units, respectively, and reads in time division the N sets of demodulated data written in the N sets of buffers and an error correction unit which inputs N sets of demodulated data read from the above-mentioned buffer unit, performs error correction one by one, and, in the process of the error correction, multiplexes the N sets of above-mentioned demodulated data, which have been error-corrected, in a period not used by one segment reception to output the data as one transport stream multiplex data.

According to another aspect of the present invention, an OFDM receiving method is provided, which includes demodulating one segment broadcasting signals of terrestrial digital broadcasting received with N (N is an integer of two or more) sets of antennas to obtain N sets of demodulated data, holding temporarily these N sets of demodulated data in N sets of buffers respectively, reading N sets of demodulated data written in the N sets of buffer in time division, and, in the process of inputting the N sets of demodulated data, read in time division, into an error correction unit and performing error correction one by one, multiplexing the N sets of above-mentioned demodulated data, which have been error-corrected, in a period not used in the one segment reception, to output the data as one serial transport stream multiplex data.

BRIEF DESCRIPTION OF THE DRAWINGS

FIG. 7 is a block diagram of an OFDM receiving apparatus of a second embodiment of the present invention;

FIG. 12 is a drawing showing multiplex frame configuration of one segment reception;

FIG. 13 is a drawing showing a transmission TSP number per frame of an information bit rate of a one segment format;

FIG. 14 is a block diagram of an error correction unit of a conventional OFDM apparatus in the case that a channel number is one; and FIG. 15 is a block diagram of an error correction unit of an OFDM apparatus of the present invention in the case that a channel number is four.

DETAILED DESCRIPTION OF THE PREFERRED EMBODIMENTS

Embodiments of the present invention will be described with reference to drawings.

Figure 6A:
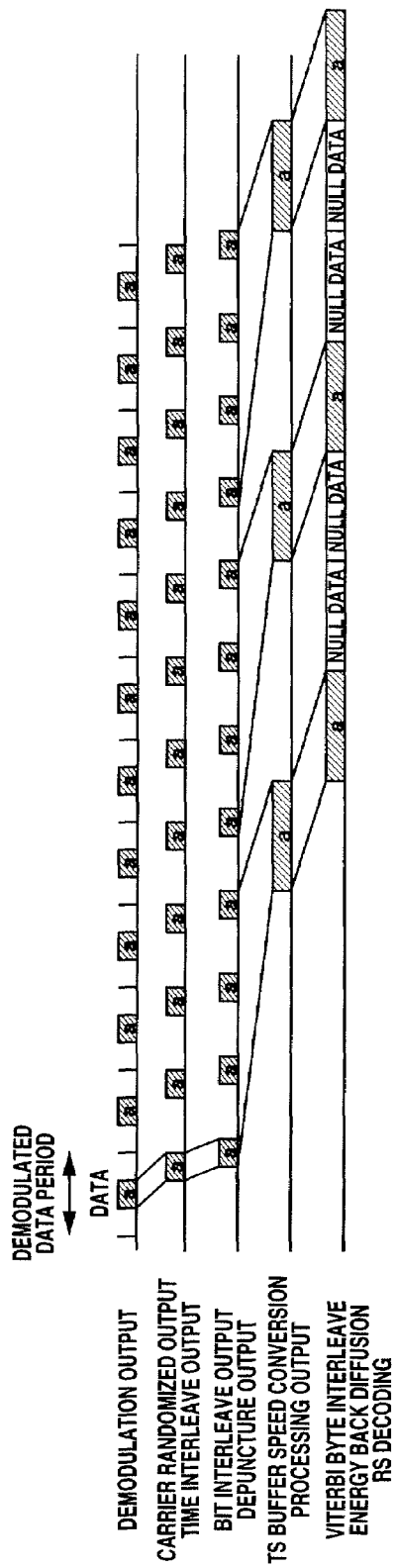
FIG. 6A is a timing chart showing TS output timing of conventional one segment reception.

In one segment reception, since a bit rate is low, a lot of null data are inserted between transport stream (hereafter, TS) data of an error correction unit (refer to FIG. 6A).

Then, the present invention is configured so that, by synchronizing a plurality of antenna outputs by saving a plurality of demodulated data in a buffer device temporarily after performing demodulation processing, and reading the saved data in time division to perform error correction processing, the null data can be replaced with TS data of two or more channels, and thereby, all of the demodulated data of two or more channels can be also supplied even in two or more channel reception to a subsequent stage of TS decoder as one serial TS multiplex data.

FIG. 12 shows multiplex frame configuration of one segment reception (reference document: Transmission system of ground digital audio broadcast ARIB STD-B29 version 1.1). FIG. 13 shows a transmission TSP number per frame of an information bit rate of a one segment format (reference document: ditto).

For example, as shown in FIG. 12, when a guard interval ratio is 1/4 and one segment format is Mode 3, the transmission TSP number included in one multiplex frame becomes 320 TSP. TSP data other than null data actually transmitted in it is maximum (MAX) when the modulation system is 16QAM and the convolution code is 1/2, as illustrated in FIG. 13, and the transmission TSP number becomes 96 TSP in Mode 3. Thus, TS data other than null data is transmitted only at a rate of about one per 3 TSP. Two thirds are null data and one third is data other than null data.

An OFDM receiving apparatus includes an antenna, a receiving unit (including a tuner), a demodulation unit, an error correction unit, a TS decoder, an audio decoder, and a video decoder.

FIG. 14 shows a block diagram of an error correction unit of the OFDM apparatus in the case that a channel number is one. The demodulated data from a demodulation unit which is a preceding stage is given carrier randomizing processing in a processing unit 9-1 and memory 9-1a, and is given time interleave processing in a processing unit 9-2 and memory 9-2a. Then, the demodulated data is given bit interleave processing in a processing unit 9-3 and memory 9-3a, depuncture processing in a processing unit 9-4, TS buffer speed conversion processing in a processing unit 9-5 and memory 9-5a, Viterbi decoding processing in a processing unit 9-6 and memory 9-6a, byte interleave processing in a processing unit 9-7 and memory 9-7a, energy back diffusion processing in a processing unit 9-8, and Reed-Solomon (RS) decoding processing in a processing unit 9-9 and memory 9-9a.

When it is necessary to have a plurality of receivers by two or more channel reception, it is naturally necessary to have a plurality of the error correction units. In addition, it becomes necessary to have output terminals of TS output data for a plurality of channels and a plurality of TS clock output terminals. A TS decoder located in a post-stage of the plurality of error correction units needs to have a plurality of TS data input terminals for inputting the TS data, and a plurality of clock input terminals.

Figure 1:
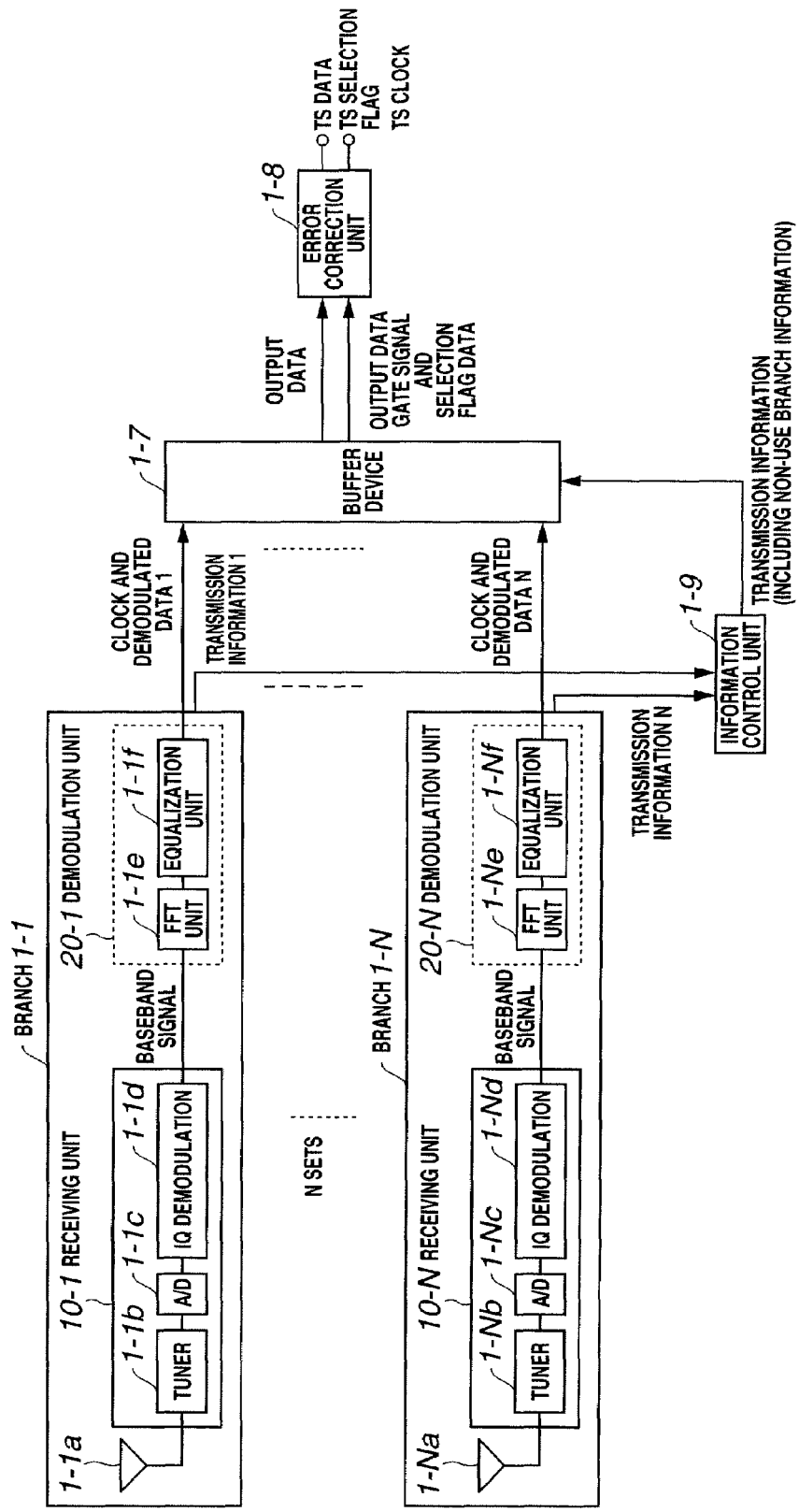
FIG. 1 is a block diagram of an OFDM receiving apparatus of a first embodiment of the present invention.

In embodiments of the present invention described after FIG. 1, since an error correction unit is shared by a plurality of channels when a receiver which enables two or more channel reception is constructed, in the error correction unit, circuit scale does not increase other than an inside of a memory unit shown by a dotted line border of reference numeral 9-10 in FIG. 14 (when a channel receiving number is increased, an increase in memory according to the channel number is needed at least on a system).

FIG. 15 shows a block diagram of an error correction unit in the case that a channel number is four. A block in FIG. 15 having reference numeral which is the same as that in FIG. 14 shows a block which performs the same processing as that in FIG. 14. In FIG. 15, the memory number in the memory unit 9-10 is the channel receiving number. For example, in the case of four channels, the memory with reference numeral 9-1a increases by three, that is, 9-1b, 9-1c, and 9-1d. However, the processing units 9-1 to 9-9, and memories 9-6a and 9-9a do not increase, even if a channel receiving number increases.

First Embodiment

FIG. 1 shows a block diagram of an OFDM receiving apparatus of a first embodiment of the present invention.

In the following embodiment, configuration of a circuit portion which is a preceding stage to a TS decoder (having a function of separating video, sound, data, and the like from TS) in the OFDM receiving apparatus will be described. In FIG. 1, one branch is constructed of an antenna, a receiving unit, and a demodulation unit, and has configuration which can simultaneously receive N sets of channels by N sets of branches. In addition, according to a parameter of current one segment reception, when Mode, carrier modulation, and a convolution code are selected, multiplex becomes possible up to a maximum of six-channel reception.

In FIG. 1, the OFDM receiving apparatus includes N sets of branches 1-1 to 1-N, a buffer device 1-7, an error correction unit 1-8, and an information control unit 1-9. In a post-stage of the error correction unit, a TS decoder (not shown) which also includes a function of separating and picking out TS data of a specific channel from TS multiplex data is arranged.

Since configuration of respective branches is the same, the branch 1-1 will be described.

The branch 1-1 includes antenna 1-1a, a receiving unit 10-1 and a demodulation unit 20-1. The receiving unit 10-1 includes a tuner 1-1b, an A/D converter 1-1c, and an IQ demodulation unit 1-1d. The demodulation unit 20-1 includes an FFT (Fast Fourier Transform) unit 1-1e and an equalization unit 1-1f.

The receiving unit 10-1 in the branch 1-1 receives a high frequency (RF) signal from the antenna 1-1a, performs tuning and down conversion into a baseband signal by the tuner 1-1b, converts an analog signal into a digital signal by the A/D converter 1-1c, and outputs a digital complex baseband signal from the IQ demodulation unit 1-1d. Then, the complex baseband signal is supplied to the demodulation unit 20-1.

The demodulation unit 20-1 first converts a time-axis signal into a frequency-axis signal by FFT processing in the FFT unit 1-1e, and then performs correction in a time direction and a frequency direction in the equalization unit 1-1f.

The above configuration is the same as in the branches 1-2 to 1-N. Here, receiving units 10-1 to 10-N and demodulation units 20-1 to 20-N construct a reception and demodulation units.

Next, demodulated data and a clock of each branch in the N sets of branches 1-1 to 1-N are supplied to the buffer device 1-7. In addition, transmission information (one segment format (Mode), carrier demodulation, a convolution code, a guard interval ratio, and an OFDM synchronization determination result of a demodulation unit) of each branch is supplied to the information control unit 1-9. Here, the OFDM synchronization determination result of a demodulation unit means a result of determining quality of a reception state by whether a demodulation output in a required level is obtained by performing demodulation by multiplying synchronizing signal wave forms for demodulation, which are synchronized, with many carrier waves respectively (this is called synchronous detection).

The information control unit 1-9 stops TS multiplex of data in the branch in a bad reception state by detecting a branch where a reception state is very bad determined by the OFDM synchronization determination result of a demodulation unit and supplying the information on a non-use branch to the buffer device 1-7. Hence, non-use branch information is included in the transmission information outputted from the information control unit 1-9. The buffer device 1-7 includes N sets of buffers 2-1 to 2-N to which N sets of demodulated data and clocks from demodulation units 20-1 to 20-N of respective N sets of branches 1-1 to 1-N are supplied.

The buffer device 1-7 can output TS multiplex data which is given time division multiplexing from the buffer device 1-7 by writing the demodulated data from respective branches in respective corresponding buffers in respective timing to perform synchronization, and reading the demodulated data in time division in proper timing, supplies the demodulated data to a next stage of the error correction unit 1-8 to perform error correction processing, and outputs a TS data output, a TS clock, and a TS selection flag.

Figures 2, 3:
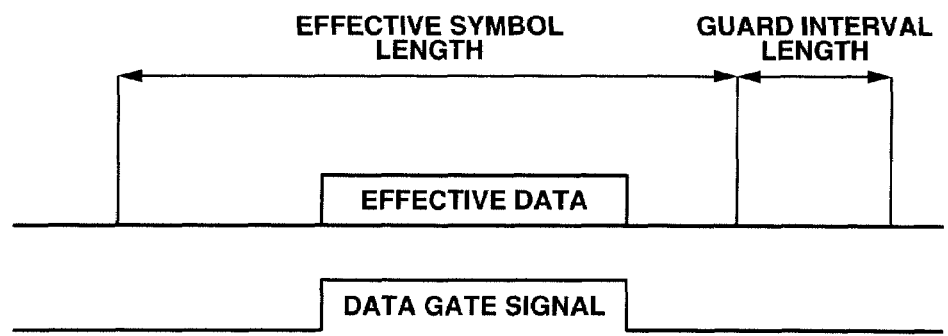
FIG. 2 is a drawing showing a sample number of demodulated data supplied from a demodulation unit of a branch in FIG. 1.
FIG. 3 is a chart showing demodulated data supplied from a demodulation unit of a branch in FIG. 1.

FIGS. 2 and 3 show demodulated data supplied from a demodulation unit of a branch in FIG. 1. FIG. 2 shows a sample number of demodulated data, and FIG. 3 shows demodulated data. Demodulated data includes an effective symbol length and a guard interval length. The effective data is settled in the effective symbol length. The effective data can be taken out from within the effective symbol length using a data gate signal.

Figure 4:
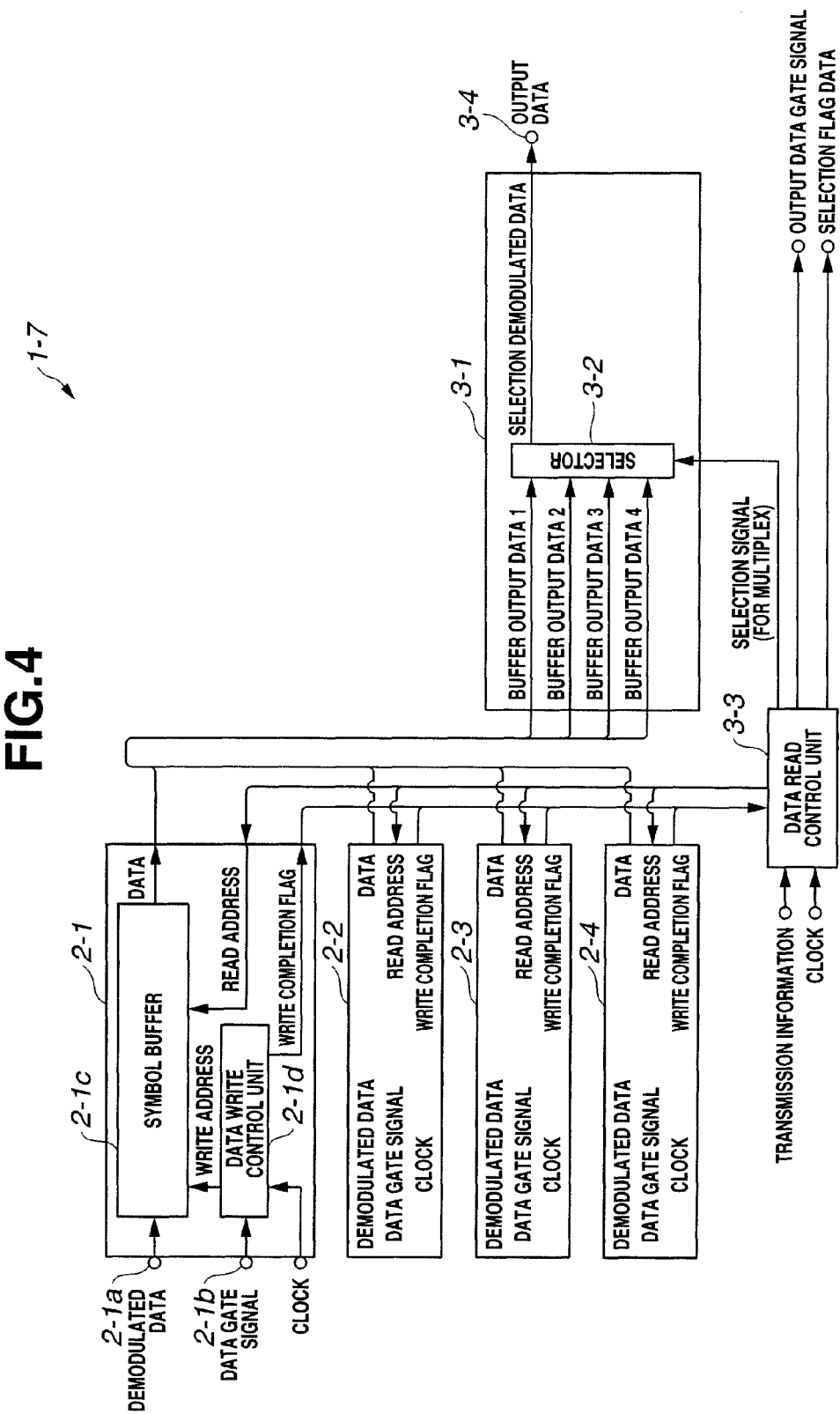
FIG. 4 is a block diagram of a configuration example of a buffer device shown in FIG. 1.

FIG. 4 shows a block diagram of a configuration example of the buffer device 1-7 shown in FIG. 1. FIG. 4 shows a case of N=4.

In FIG. 4, the buffer device 1-7 receives demodulated data, a data gate signal, and a clock from each demodulation unit of four branches. The buffer device 1-7 includes four buffers 2-1 to 2-4, a TS multiplex unit 3-1 as a time-division multiplex unit which includes a selector 3-2 for performing time-division multiplexing of four buffer output data read from the four buffers 2-1 to 2-4, and a data read control unit 3-3 which controls read of the demodulated data written in the four buffers 2-1 to 2-4. Since the four buffers 2-1 to 2-4 have the same configuration, only the configuration of the buffer 2-1 will be described.

The buffer 2-1 includes a symbol buffer 2-1c and a data write control unit 2-1d.

The buffer 2-1 receives demodulated data 2-1a, a data gate signal 2-1b, showing an effective data period within an effective symbol length, and a clock from a preceding stage of branch 1-1. The data gate signal 2-1b is supplied to the data write control unit 2-1d, and the demodulated data 2-1a is written in the symbol buffer 2-1c with a write address generated in the data write control unit 2-1d. When completing writing of data in the demodulated data into the symbol buffer 2-1c, the data write control unit 2-1d outputs a write completion flag.

Note that, since demodulated data is asynchronously supplied to each buffer from a demodulation unit of each branch, it is better for the symbol buffer 2-1c to have capacity of two or more symbols of data. The write completion flag outputted from each buffer corresponding to each branch is supplied to the data read control unit 3-3. The data read control unit 3-3 receives the information on a non-use branch included in the transmission information from the information control unit 1-9 in FIG. 1.

Furthermore, although FIG. 4 shows the case that the number of branches is four, when the number of branches is N, it can be also described as follows. Namely, the buffer device 1-7 includes N (N is an integer of two or more) sets of symbol buffers which are provided in the N sets of buffers, and into which data in the demodulated data is written, N sets of data write control units which write N sets of demodulated data from the N sets of reception and demodulation units in the N sets of symbol buffers in the N sets of buffers using output clocks of the N sets of reception and demodulation units respectively, and the time-division data read control unit which reads the N sets of demodulated data from the N sets of buffers in time division using a common clock.

The subsequent processing will be described using a flow chart of TS multiplex processing shown in FIG. 5 in the buffer device 1-7 and a timing chart of TS multiplex processing shown in FIG. 6B in the error correction unit 1-8.

Figure 5:
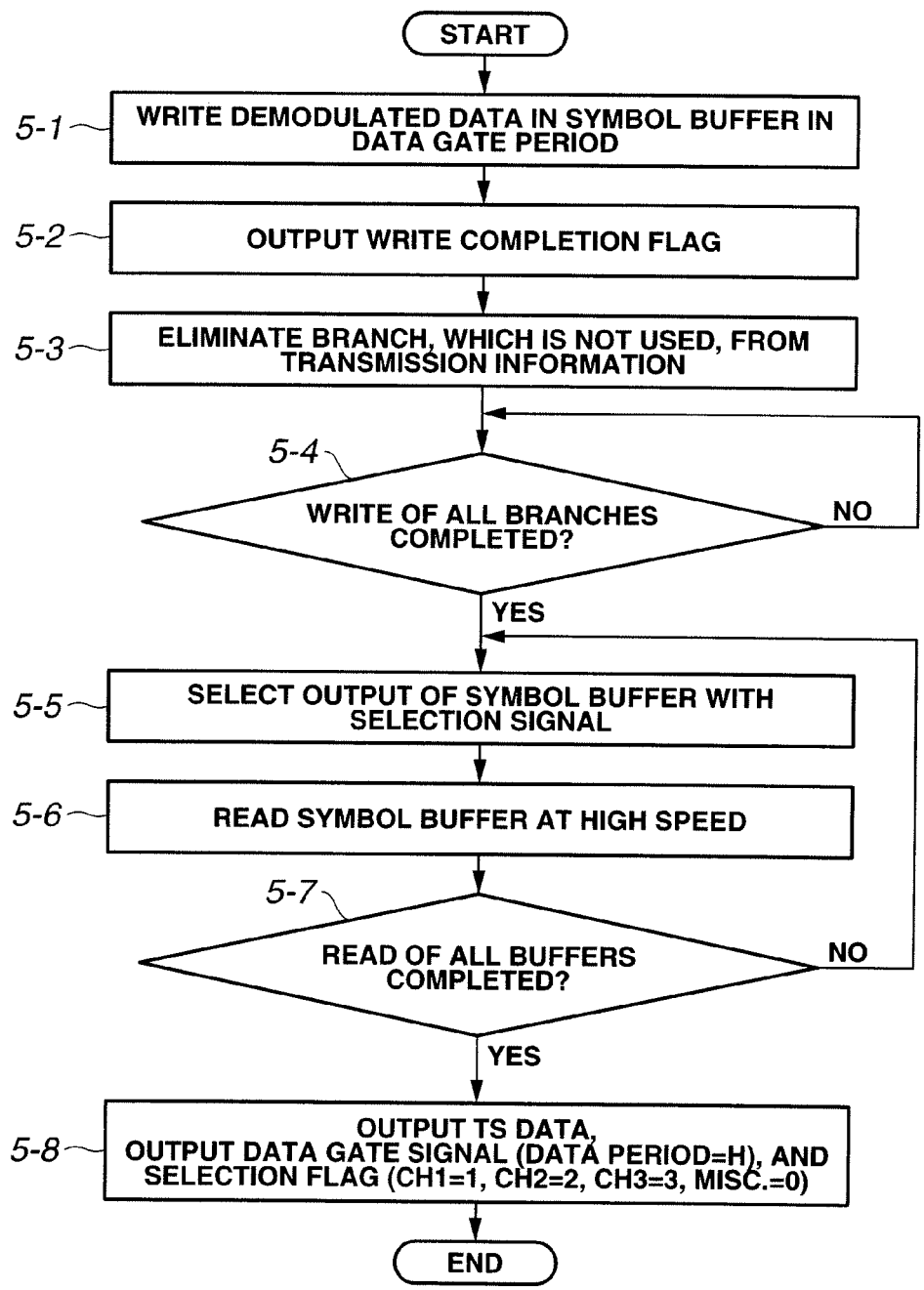
FIG. 5 is a flow chart of TS multiplex processing of the buffer device in FIG. 4.

With reference to FIG. 5, a flow of the TS multiplex processing of the buffer device 1-7 in FIG. 4 will be described.

In FIG. 5, the data write control unit of each buffer writes demodulated data in each symbol buffer and outputs a write completion flag (steps 5-1 and 5-2), and the data read control unit 3-3 removes information regarding the non-use branch from transmission information (step 5-3). Then, the data read control unit 3-3 confirms that the writing into each symbol buffer of all the branches is completed (step 5-4), and thereafter, not only sequentially supplies a selection signal of a branch to the selector 3-2 (step 5-5), but also supplies a readout address to a buffer of the branch concerned to read the data held in each symbol buffer in time division for all the branches (in turn) (steps 5-6 and 5-7). The selection demodulated data outputted from the selector 3-2 is outputted from an output terminal 3-4. Thereby, the selector 3-2 outputs TS data obtained by the demodulated data of all the branches being given the time-division multiplexing. The data read control unit 3-3 also outputs selection flag data, which shows which branch data (except for the non-use branch) is outputted, and a data gate signal (step 5-8). Here, at step 5-8, each branch is expressed by a channel (CH), and it is expressed that a flag 1 is on as the branch 1-1 in the case of CH=1 and a flag 2 is on as the branch 1-2 similarly in the case of CH=2.

Figure 6B:
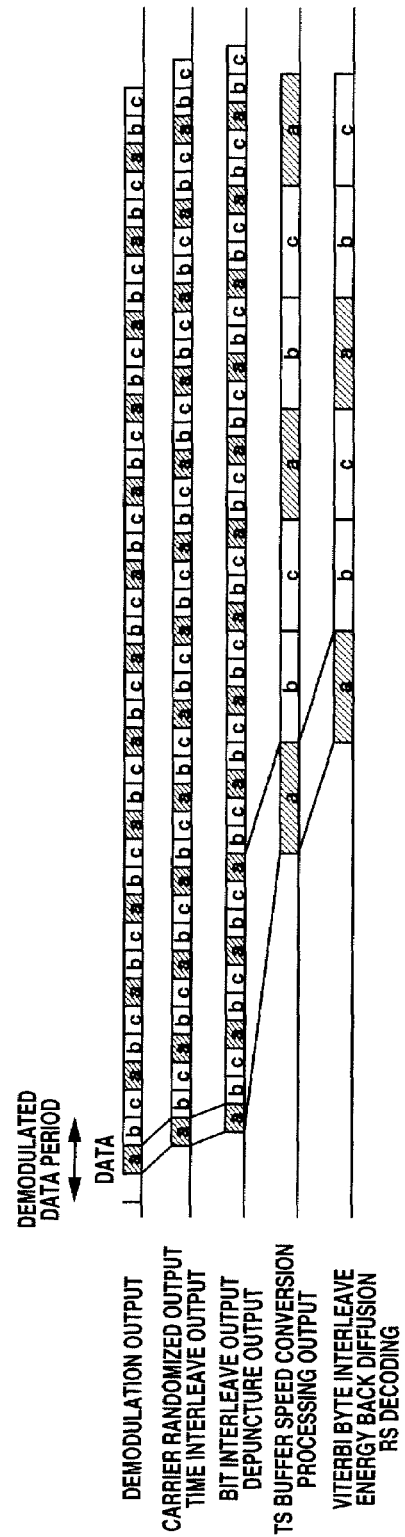
FIG. 6B is a timing chart showing an example of output timing of TS multiplex processing of an error correction unit in FIG. 1.

FIGS. 6A and 6B show timing charts showing an example of output timing of TS multiplex processing of the error correction unit in FIG. 1 with comparing the output timing with TS output timing of usual one segment reception. FIG. 6A shows the TS output timing of one segment reception, and FIG. 6B shows the output timing of three-channel multiplex TS. However, in FIG. 6B and at step 5-8 in FIG. 5, it is assumed that data of one buffer (e.g., data of a buffer corresponding to the branch 1-4) among the buffers corresponding to four branches in FIG. 4 is removed as the non-use branch, and only the data of three channels is multiplexed.

FIG. 6A shows a TS data output timing chart in one channel of conventional one segment reception. The timing chart of FIG. 6A corresponds to timing of the error correction processing in the error correction unit in FIG. 14. Since this is one segment reception in the case of conventional receiver structure that a number of branches is only one, when receiving another channel, it is necessary to tune in with one tuner in the same branch and to change a channel, and it takes 2 to 4 seconds for the channel change.

In FIG. 6A, the demodulated data is given carrier randomization processing, time interleave processing, bit interleave processing, and depuncture processing in processing units 9-1 to 9-4 of the error correction unit, and effective data a is collected by one TS by the TS buffer speed conversion processing unit 9-5. This is given Viterbi decoding processing, byte interleave processing, energy back diffusion processing, and Reed-Solomon (RS) processing by processing units 9-6 to 9-9. All become null data except the effective data a. Hence, the output TS data from the error correction unit includes the TS data a and null data.

Next, FIG. 6B shows a TS multiplex timing chart of one segment reception in two or more channels (three channels in the chart). The timing chart of FIG. 6B corresponds to timing of the error correction processing in the error correction unit in FIG. 15. Three effective data (a to c) which is given the time-division multiplexing as a demodulation output in the buffer device 1-7 is given error correction processing one by one, and the effective data (a to c) equivalent to one TS for every channel is collected in the TS buffer speed conversion processing unit 9-5. In FIG. 6B, the effective data (b and c) equivalent to one TS is collected in the TS buffer speed conversion processing unit 9-5 in a period not used by the one segment reception. Furthermore, when remaining error correction processing after the Viterbi decoding processing is executed, output TS data of the error correction unit becomes two or more channel TS output data in which the effective data (b and c) (refer to FIG. 6B) is inserted in null data periods (refer to FIG. 6A).

According to the first embodiment, when making two or more channels of one segment broadcasting signals of terrestrial digital broadcasting receivable simultaneously, by multiplexing two or more channels of demodulated data in the periods not used by the one segment reception, it is possible to achieve the reception without making a circuit increase greatly even if a channel number increases.

Next, a configuration example of adding diversity processing to the first embodiment will be described.

Second Embodiment

FIG. 7 shows a block diagram of an OFDM receiving apparatus of a second embodiment of the present invention. The same reference symbols are applied to components having the same functions as those in FIG. 1.

In FIG. 7, the OFDM receiving apparatus includes N sets of branches 1-1 to 1-N, a buffer device 1-7A, an error correction unit 1-8, and an information control unit 1-9. In addition, in a post-stage of the error correction unit 1-8, a TS decoder (not shown) which also includes a function of separating and picking out TS data of a specific channel from TS multiplex data is arranged.

The second embodiment differs from the first embodiment in respect of having configuration of being executable to switch the TS multiplex processing and diversity processing selectively as the buffer device 1-7A. The buffer device 1-7A has configuration of switching the two processings using a switching signal from an external switching signal input terminal 13-1.

Figure 8:
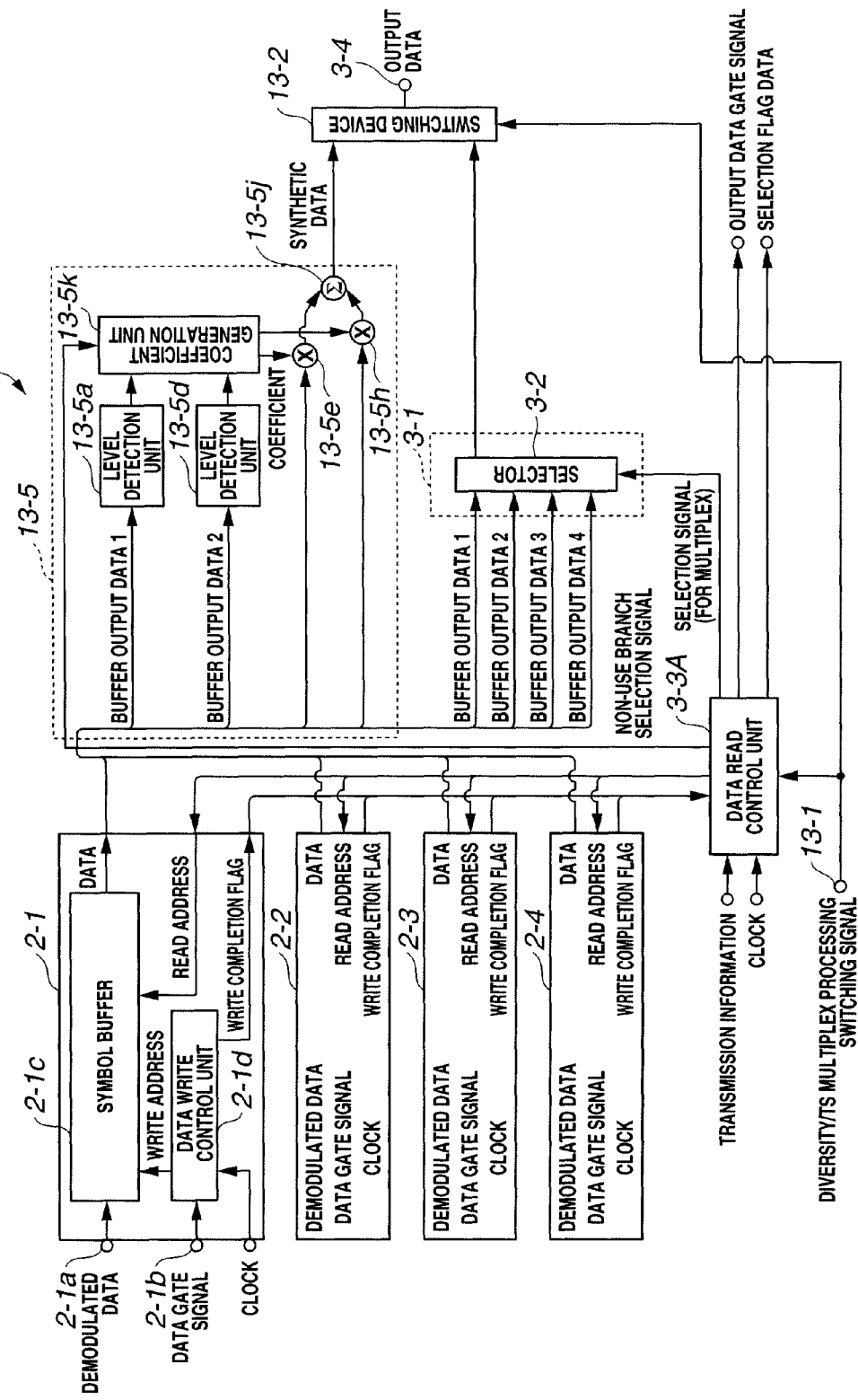
FIG. 8 is a block diagram of a configuration example of a buffer device shown in FIG. 7.

FIG. 8 shows a block diagram of a configuration example of the buffer device 1-7A in FIG. 7.

The buffer device 1-7A shown in FIG. 8 has configuration of adding a diversity unit 13-5 and a switching device 13-2 to the configuration in FIG. 4. The same reference symbols are applied to the same parts in FIG. 4.

That is, in the present embodiment, it is made to newly provide the diversity unit 13-5 as a synthesizing unit besides the TS multiplex unit 3-1 in a post-stage of the buffers 2-1 to 2-4 shown in FIG. 4, to make read control of the buffers 2-1 to 2-4 by the data read control unit 3-3A switchable so as to be able to perform simultaneous readout besides the time-division readout, and to enable to switch and output a TS multiplex processing output, obtained by the time-division readout, and a diversity processing output, obtained by the simultaneous readout, by the switching device 13-2. Thus, the data read control unit 3-3A includes a simultaneous data read control unit and the time-division data read control unit.

By synchronously reading and synthesizing demodulated data of, for example, two branches 1-1 and 1-2 among the four branches from the buffers 2-1 and 2-2, the diversity unit 13-5 can obtain stable demodulated data on the basis of a plurality of reception signals from a plurality of (two in the example in FIG. 8) antennas arranged in different locations like on a vehicle, or different directions. It is natural that it is possible to improve diversity reception performance when a number of branches used for diversity reception is increased to three or four.

The diversity unit 13-5 includes level detection circuits 13-5a and 13-5d which detect respective signal levels of buffer outputs corresponding to the two branches 1-1 and 1-2, coefficient generation circuit 13-5k for giving each proper weighting factor according to a non-use branch signal and to the detection levels of the level detection circuits 13-5a and 13-5d, to the buffer outputs, corresponding to the two branches 1-1 and 1-2, respectively, multipliers 13-5e and 13-5h which multiply the buffer outputs corresponding to the two branches 1-1 and 1-2 by respective weighting factors, and a synthesizing unit 13-5j synthesizing outputs of the two multipliers 13-5e and 13-5h. The coefficient generation circuit 13-5k generates the weighting factor proportional to, for example, each detection level of the level detection circuits 13-5a and 13-5d. This is because it is conceivable that a reproducing output which has highest fidelity and is most suitable can be obtained by the plurality of demodulated data being weighted according to amplitude of the demodulation outputs when the same channel is received with a plurality of antennas and tuners.

The TS multiplex unit 3-1 which performs the TS multiplex processing is the same as the TS multiplex unit 3-1 in FIG. 4.

The switching device 13-2 selectively switches either of the synthetic output from the diversity unit 13-5 and the TS multiplex processing output from the TS multiplex unit 3-1 according to a diversity/TS multiplex processing switching signal from the external switching signal input terminal 13-1.

The data read control unit 3-3A switches the read control of the buffers 2-1 to 2-4 between the simultaneous readout and time-division readout according to the diversity/TS multiplex processing switching signal from the external switching signal input terminal 13-1.

Respective demodulated data are written into the buffers 2-1 to 2-4 from the preceding stage of branches 1-1 to 1-4 respectively like the case in FIG. 4. In FIG. 8, supposing a non-use branch does not exist unlike the case of FIG. 4, description will be performed.

In the buffer device 1-7A with the above-mentioned configuration, the buffers 2-1 to 2-4 corresponding to the branches 1-1, 1-2, 1-3, and 1-4 not only can perform the TS multiplex processing among 4 branches like the case in FIG. 4 respectively, but also can perform the diversity processing in the two branches 1-1 and 1-2, in 4 branch reception.

When the diversity reception processing is selected, each tuner in the branches 1-1 and 1-2 which perform the diversity processing is given channel selection control so that the same channel may be tuned in by a control unit not shown.

Figure 9:
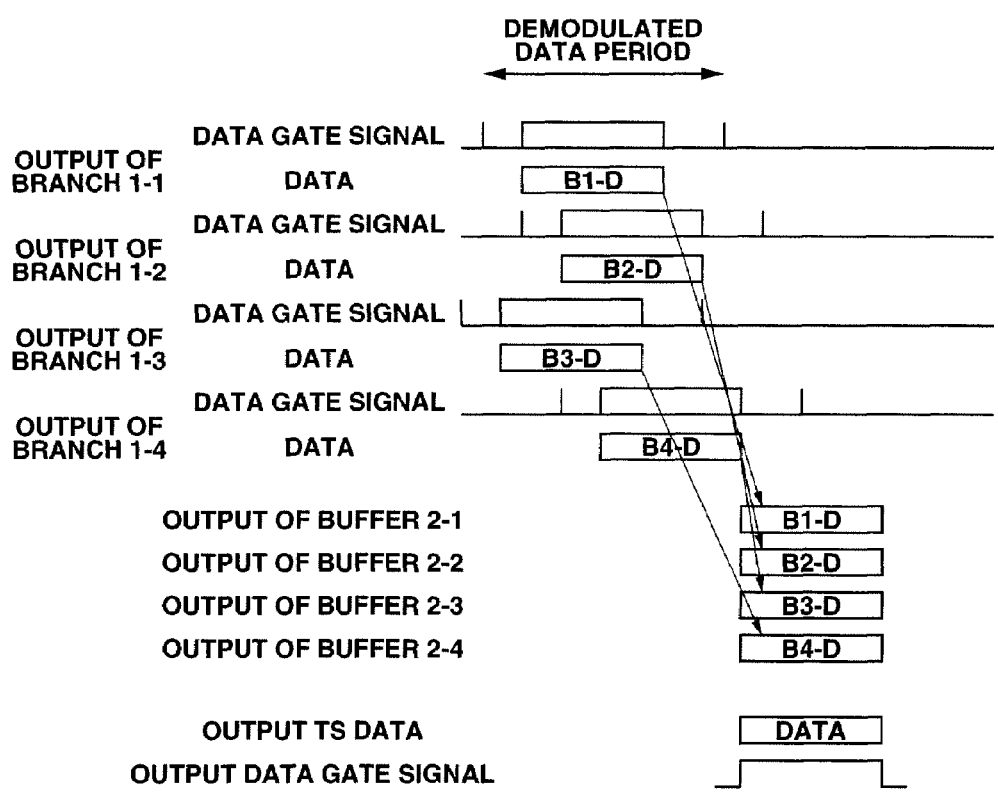
FIG. 9 is a timing chart of diversity processing.

In addition, in the present embodiment, since the outputs from the plurality of branches 1-1 to 1-4 which perform reception in different timing and demodulation processing are inputted into the buffers 2-1 to 2-4 to synchronize all as outputs of the buffers 2-1 to 2-4 (synchronization) using the buffer device 1-7A like the timing chart of diversity processing shown in FIG. 9, it is easily possible to achieve the diversity reception which synthesizes the outputs of the plurality of branches to obtain a stable received output.

The present embodiment tunes the same channel with tuners of two or more (here, two) branches in a plurality of branches to perform the demodulation processing, reads data written in the buffers 2-1 and 2-2 simultaneously, and performs the diversity synthesis processing using the level detection units 13-5a and 13-5d, coefficient generation unit 13-5k, multipliers 13-5e and 13-5h, and synthesizing unit 13-5j.

Moreover, although FIG. 8 shows the case that the number of branches is four, when the number of branches is N, it can be also described as follows. Namely, the buffer device 1-7A includes a simultaneous data read control unit which reads simultaneously M (M is an integer of two to N inclusive) sets of demodulated data of M sets of buffers among N (N is an integer of two or more) sets of buffers, a synthesizing unit which synthesizes the demodulated data, which are simultaneously read in the simultaneous data read control unit, in different synthetic ratios, the time-division data read control unit which reads the N sets of demodulated data from the N sets of buffers in time division using a common clock, and a switching unit which switches and outputs either of the demodulated data, which is given the time-division readout from N sets of buffers, and the synthesized demodulated data from the synthesizing unit. The different synthetic ratios mean to perform synthesis in synthetic ratios according to the received outputs of a plurality of antennas (or a plurality of demodulation outputs) (e.g., proportional to respective outputs).

Figure 10:
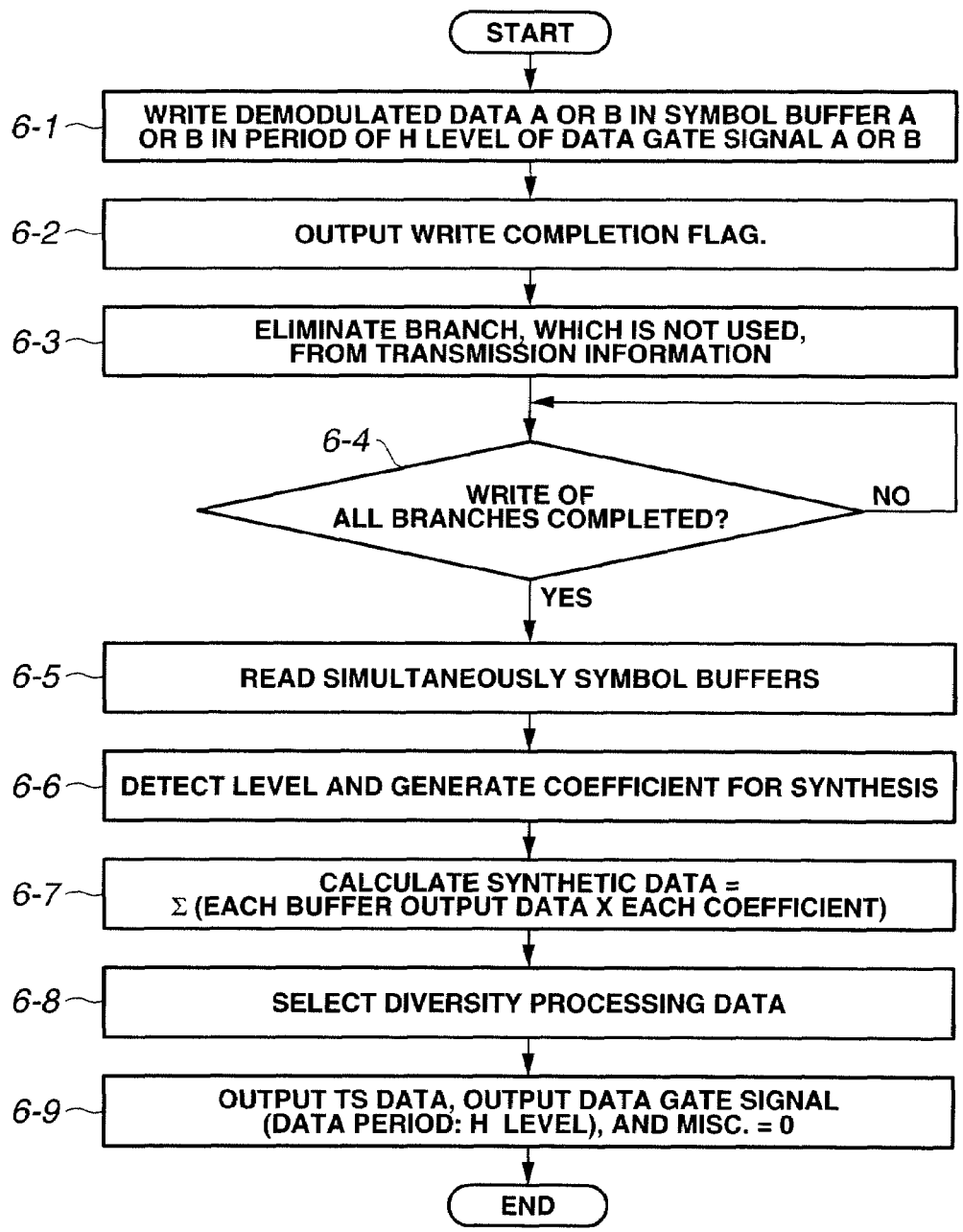
FIG. 10 is a flow chart of the diversity synthesis processing.

FIG. 10 shows a flow chart of the diversity synthesis processing. A data write control unit of each buffer writes demodulated data in each symbol buffer (step 6-1) and outputs a write completion flag (step 6-2), and a data read control unit 3-3A removes information regarding a non-use branch from transmission information if the non-use branch exists (step 6-3). In addition, a/b at step 6-1 denotes signals corresponding to the two branches 1-1 and 1-2. Further, the removal of the non-use branch information at step 6-3 is not described in the example of FIG. 8, but all the branches can be used then, the data read control unit 3-3A confirms that writing of all the branches is completed (step 6-4), and thereafter, supplies simultaneously read addresses to two symbol buffers corresponding to a plurality (two in the figure) of branches 1-1 and 1-2 to perform simultaneous read processing (step 6-5).

Then, level detection units 13-5a and 13-5d receive effective data of the branches 1-1 and 1-2 to detect amplitude of signals, and the coefficient generation unit 13-5k generates synthesis coefficients in proportion to the amplitude of the signals from the respective level detection units 13-5a and 13-5d (step 6-6). At this time, when there is a number of the branch which is not used because of a reception failure or the like, the coefficient generation unit 13-5k receives the branch number from the data read control unit 3-3A to set the coefficient at "0." After the respective coefficients are given multiplication processing by the demodulated data from the respective buffers by the multipliers 13-5e and 13-5h, both multiplier outputs are synthesized by the synthesizing unit 13-5j (step 6-7). In the meantime, the selector 3-2 sequentially selects the branches 1-1 to 1-4 like reference numeral 3-2 in FIG. 4. A four channel multiplex output from the selector 3-2, and the synthetic data from synthesizing unit 13-5j of the diversity unit 13-5 can be supplied to each of two input terminals of the switching device 13-2, either one of the TS multiplex processing or diversity processing is arbitrarily selected with the switching signal from the external switching signal input terminal 13-1 by a user performing a switching operation, and processing data of the selected one is outputted from the output terminal 3-4. Thereby, either one of the TS multiplex output, which is obtained by the time division of the demodulated data of all the branches, or the synthetic output which is obtained by the diversity synthesis processing of the plurality of demodulated data which is predetermined is outputted from the switching device 13-2. Here, the diversity processing data is selected (step 6-8). The data read control unit 3-3A outputs selection flag data (required at the time of a TS multiplex output), which show which data is outputted, and also a data gate signal (step 6-9). At step 6-9 at the time of the diversity synthesis processing, a diversity synthesis output is obtained as a TS data output, and since being unnecessary at the time of diversity processing selection, the selection flag is set at Misc.=0.

According to the second embodiment, it becomes possible to perform the diversity processing besides the TS multiplex processing using the configuration of performing the reception of two or more channels corresponding to a plurality of branches. When diversity processing is selected, it becomes possible to improve reception performance and to receive stably a target broadcast channel, by receiving the broadcast channel defined beforehand by a plurality of branches, and performing the diversity synthesis processing.

Third Embodiment

An OFDM receiving apparatus of a third embodiment is almost the same as that of block configuration in FIG. 1, and the same reference symbols are applied to components having the same functions as those in FIG. 1. The OFDM receiving apparatus includes N sets of branches 1-1 to 1-N, a buffer device 1-7B, an error correction unit 1-8, and an information control unit 1-9. In addition, in a post-stage of the error correction unit 1-8, a TS decoder (not shown) which also includes a function of separating and picking out TS data of a specific channel from TS multiplex data is arranged.

Figure 11:
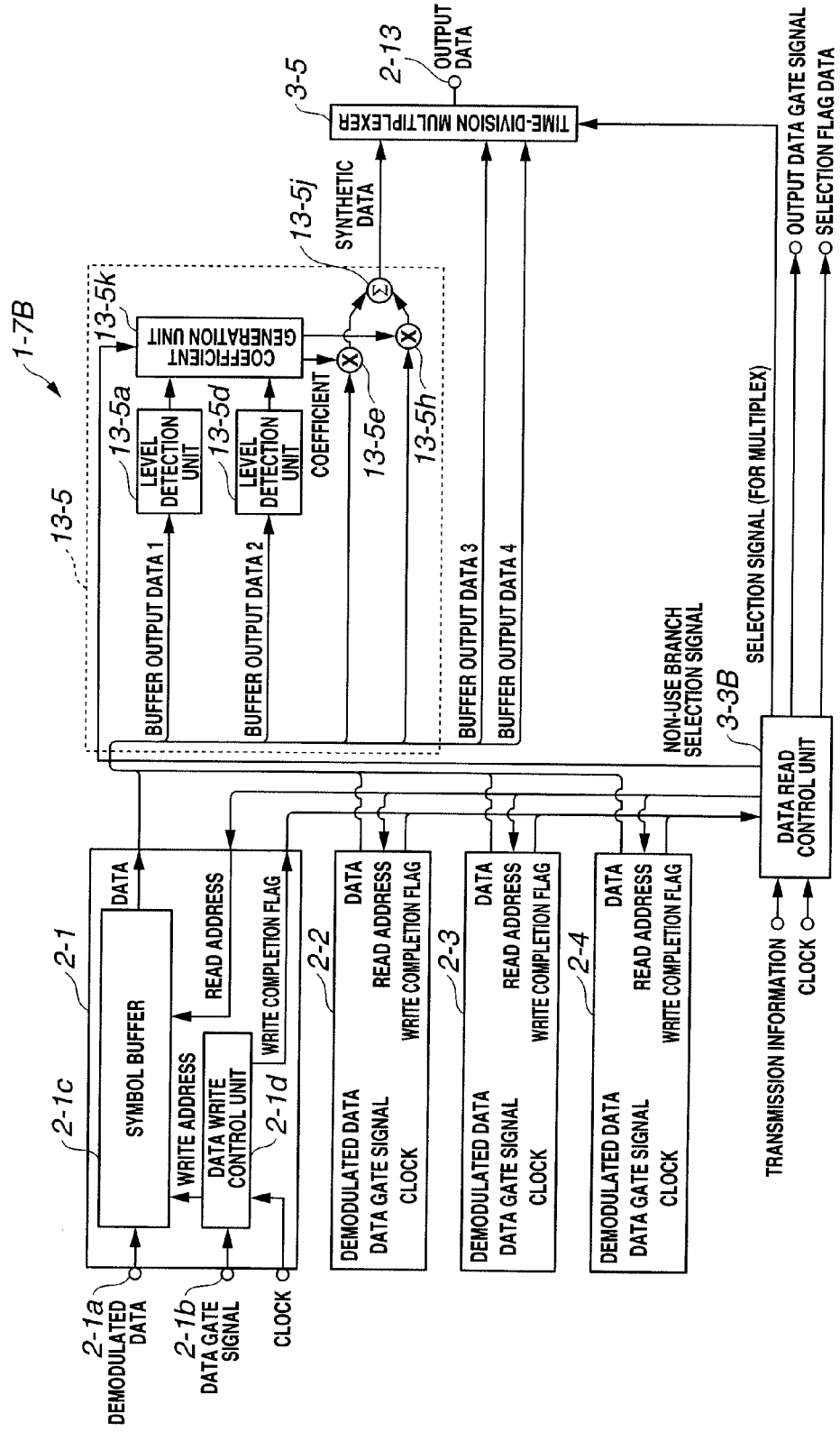
FIG. 11 is a block diagram of a configuration example of a buffer device according to an OFDM receiving apparatus of a third embodiment of the present invention.

FIG. 11 is a block diagram of a configuration example of a buffer device 1-7B according to the OFDM receiving apparatus of the third embodiment of the present invention.

In FIG. 11, the buffer device 1-7B includes four buffers 2-1 to 2-4, a data read control unit 3-3B which can read simultaneously two demodulated data (data of the same channel) of two buffers 2-1 and 2-2 among the four buffers 2-1 to 2-4, the diversity unit 13-5 which is the same diversity unit as that shown in FIG. 8 and can synthesize in different synthetic ratios two demodulated data, simultaneously read by the data read control unit 3-3B, and the time-division multiplexer 3-5 which can multiplex and output two demodulated data read from the buffers 2-3 and 2-4 other than the two buffers 2-1 and 2-2, and one synthesized demodulated data from the diversity unit 13-5 in time division. The time-division multiplexer 3-5 internally includes, for example, a buffer unit which synchronizes one synthetic demodulated data which is obtained by synthesizing data of the buffers 2-1 and 2-2, and two demodulated data of the buffers 2-3 and 2-4, and the selector 3-2 (not shown) which is the same as that shown in FIG. 1 or FIG. 8 for performing time-division multiplexing of these three demodulated data.

Note that, although FIG. 11 shows the case that the number of branches is four, when the number of branches is N, it can be also described as follows. Namely, the buffer device 1-7B includes a simultaneous data read control unit which reads simultaneously M (M is an integer of two to N inclusive) sets of demodulated data of M sets of buffers among N (N is an integer of two or more) sets of buffers, a synthesizing unit which synthesizes the demodulated data, which are simultaneously read in the simultaneous data read control unit, in different synthetic ratios, a time-division multiplexing unit which multiplexes and outputs demodulated data from the buffers except the M sets of buffers, and the synthesized demodulated data from the synthesizing unit in time division.

According to the third embodiment, since it is possible to select the synthetic data from the diversity unit 13-5 and the output effective data from the buffers 2-3 and 2-4 one by one and to output the data as TS multiplex data by the selector 3-2 in the time-division multiplexer 3-5, it is possible in a subsequent stage of TS decoder not only to take out and watch demodulated data of a specific broadcast channel which is given the diversity synthesis processing in high receiving performance, but also to take out and watch the demodulated data of other branches which is not given the diversity processing. Hence, even if a user does not operate diversity/TS multiplex processing switching manually, it is possible to perform branch reception of demodulated data, which is given diversity processing, and the other just by a channel switching operation.

As described above, according to the present invention, it is possible to achieve an OFDM receiving apparatus which can output received outputs of two or more channels with one set of TS data and TS clock similarly to one segment reception without making a circuit increase greatly even if a channel number increases. Since it is the configuration of receiving two or more channels simultaneously, when a channel is switched, it becomes possible to switch a screen instantaneously.

Having described the embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An OFDM receiving apparatus, comprising:
   N (N is an integer of two or more) sets of reception and demodulation units which input one segment broadcasting signals of terrestrial digital broadcasting received with N sets of antennas and demodulate the signals;
   a buffer unit which comprises N sets of buffers which hold temporarily N sets of demodulated data, which are demodulated in the N sets of reception and demodulation units, respectively, and reads in time division the N sets of demodulated data written in the N sets of buffers; and
   an error correction unit which inputs N sets of demodulated data read from the buffer unit in time division, performs error correction one by one, and, in the process of the error correction, multiplexes the N sets of demodulated data, which have been error-corrected, in a period not used by one segment reception to output the data as one transport stream multiplex data.

2. The OFDM receiving apparatus according to claim 1, wherein the buffer unit comprises:
   N sets of symbol buffers which are provided in the N sets of buffers, and into which data in the N sets of demodulated data are written;
   N sets of data write control units which write N sets of demodulated data from the N sets of reception and demodulation units in the N sets of symbol buffers in the N sets of buffers using output clocks of the N sets of reception and demodulation units respectively; and
   a time-division data read control unit which reads in time division the N sets of demodulated data from the N sets of buffers using a common clock.

3. The OFDM receiving apparatus according to claim 2, wherein the buffer unit further comprises a time-division multiplex unit which sequentially inputs the demodulated data read in time division by control of the time-division data read control unit, and outputs the demodulated data which is given time-division multiplexing.

4. The OFDM receiving apparatus according to claim 2, further comprising:
   a reception determination unit which determines a receiving state of each antenna of the N sets of antennas; and
   an exclusion unit which excludes an output of the buffer corresponding to the antenna, determined as a reception state being poor from a result of the reception determination unit, from an object of the time division.

5. The OFDM receiving apparatus according to claim 1, wherein the buffer unit comprises:
   a simultaneous data read control unit which reads simultaneously M (M is an integer of two to N inclusive) sets of demodulated data of M sets of buffers among the N sets of buffers;
   a synthesizing unit which synthesizes in different synthetic ratios the M sets of demodulated data, which are simultaneously read in the simultaneous data read control unit;
   a time-division data read control unit which reads the N sets of demodulated data from the N sets of buffers in time division using a common clock;
   a time-division multiplex unit which sequentially inputs the demodulated data read in time division by control of the time-division data read control unit, and outputs the demodulated data which is given time-division multiplexing; and
   a switching unit which switches and outputs either of the demodulated data, which is given the time-division multiplexing, from the time-division multiplex unit, and the demodulated data, which is synthesized, from the synthesizing unit.

6. The OFDM receiving apparatus according to claim 5, wherein the synthesizing unit comprises:
   M sets of level detection circuits which detect M sets of demodulated data from the M sets of buffers respectively;
   a coefficient generation circuit which gives weighting factors according to non-use branch information and detection levels of the M sets of level detection circuits, respectively to M sets of demodulated data from the M sets of buffers;

M sets of multipliers which multiply M sets of demodulated data from the M sets of buffers by the respective weighting factors; and a synthesizing unit which synthesizes the output of the M sets of multipliers.

7. The OFDM receiving apparatus according to claim 6, wherein the coefficient generation circuit generates a weighting factor proportional to each detection level of the M sets of level detection circuits.

8. The OFDM receiving apparatus according to claim 5, further comprising:

a reception determination unit which determines a receiving state of each antenna of the N sets of antennas; and an exclusion unit which excludes an output of the buffer corresponding to the antenna, determined as a reception state being poor from a result of the reception determination unit, from an object of the time division.

9. The OFDM receiving apparatus according to claim 5, further comprising:

a reception determination unit which determines a receiving state of each antenna of the N sets of antennas; and an exclusion unit which excludes an output of the buffer corresponding to the antenna, determined as a reception state being poor from a result of the reception determination unit, from a synthesis object of the synthesizing unit.

10. The OFDM receiving apparatus according to claim 1, wherein the buffer unit comprises:

a simultaneous data read control unit which reads simultaneously M (M is an integer of two to N inclusive) sets of demodulated data of M sets of buffers among N (N is an integer of two or more) sets of buffers;

a synthesizing unit which synthesizes in different synthetic ratios the M sets of demodulated data, which are simultaneously read in the simultaneous data read control unit; and a time-division multiplex unit which multiplexes and outputs the demodulated data from buffers other than the M sets of buffers, and the demodulated data, which is synthesized, from the synthesizing unit in time division.

11. The OFDM receiving apparatus according to claim 10, wherein the synthesizing unit comprises:

M sets of level detection circuits which detect M sets of demodulated data from the M sets of buffers respectively;

a coefficient generation circuit which gives weighting factors according to non-use branch information and detection levels of the M sets of level detection circuits, respectively to M sets of demodulated data from the M sets of buffers;

M sets of multipliers which multiply M sets of demodulated data from the M sets of buffers by the respective weighting factors; and a synthesizing unit which synthesizes the output of the M sets of multipliers.

12. The OFDM receiving apparatus according to claim 11, wherein the coefficient generation circuit generates a weighting factor proportional to each detection level of the M sets of level detection circuits.

13. The OFDM receiving apparatus according to claim 10, further comprising:

a reception determination unit which determines a receiving state of each antenna of the N sets of antennas; and an exclusion unit which excludes an output of the buffer corresponding to the antenna, determined as a reception state being poor from a result of the reception determination unit, from an object of the time division.

14. The OFDM receiving apparatus according to claim 10, further comprising:

a reception determination unit which determines a receiving state of each antenna of the N sets of antennas; and an exclusion unit which excludes an output of the buffer corresponding to the antenna, determined as a reception state being poor from a result of the reception determination unit, from a synthesis object of the synthesizing unit.

15. The OFDM receiving apparatus according to claim 1, further comprising:

a reception determination unit which determines a receiving state of each antenna of the N sets of antennas; and an exclusion unit which excludes an output of the buffer corresponding to the antenna, determined as a reception state being poor from a result of the reception determination unit, from an object of the time division.

16. The OFDM receiving apparatus according to claim 1, wherein each of the reception and demodulation units comprises:

a tuner which receives and tunes in a high frequency signal from an antenna, and performs down conversion into a baseband signal;

an A/D converter which converts an analog signal, outputted from the tuner, into a digital signal;

an IQ demodulation unit which inputs the digital output from the A/D converter, and outputs a digital complex baseband signal;

an FFT unit which inputs the complex baseband signal from the IQ demodulation unit, and converts a time-axis signal into a frequency-axis signal by FFT processing; and an equalization unit which inputs the signal from the FFT unit, performs correction of a time direction and a frequency direction, and output the signal as demodulated data.

17. The OFDM receiving apparatus according to claim 1, wherein the error correction unit comprises:

a first processing unit which comprises memory whose number is equal to a channel number, inputs demodulated data from a preceding stage of buffer unit, and performs carrier randomization processing;

a second processing unit which comprises memory whose number is equal to the channel number, inputs the signal from the first processing unit, and performs time interleave processing;

a third processing unit which comprises memory whose number is equal to the channel number, inputs the signal from the second processing unit, and performs bit interleave processing;

a fourth processing unit which inputs the signal from the third processing unit, and performs depuncture processing;

a fifth processing unit which comprises memory whose number is equal to the channel number, inputs the signal from the fourth processing unit, and performs TS buffer speed conversion processing;

a sixth processing unit which comprises memory, inputs the signal from the fifth processing unit, and performs Viterbi decoding processing;

a seventh processing unit which comprises memory whose number is equal to the channel number, inputs the signal from the sixth processing unit, and performs byte interleave processing;

an eighth processing unit which inputs the signal from the seventh processing unit, and performs energy back diffusion processing; and a ninth processing unit which comprises memory, inputs the signal from the eighth processing unit, and performs Reed-Solomon decoding processing.

18. An OFDM receiving method, comprising:

demodulating one segment broadcasting signals of terrestrial digital broadcasting received with N (N is an integer of two or more) sets of antennas to obtain N sets of demodulated data;

temporarily holding these N sets of demodulated data in N sets of buffers respectively;

reading the N sets of demodulated data written in the N sets of buffers in time division; and in the process of inputting the N sets of demodulated data, read in the time division, into an error correction unit and performing error correction one by one, multiplexing the N sets of demodulated data, which have been error-corrected, in a period not used in the one segment reception, to output the data as one serial transport stream multiplex data.

* * * * *